US010479673B2

(12) United States Patent
Wood

(10) Patent No.: US 10,479,673 B2
(45) Date of Patent: Nov. 19, 2019

(54) SADDLE BAG CONNECTOR

(71) Applicant: Charles R. S. Wood, Aurora, CO (US)

(72) Inventor: Charles R. S. Wood, Aurora, CO (US)

( * ) Notice: Subject to any disclaimer, the term of this patent is extended or adjusted under 35 U.S.C. 154(b) by 365 days.

(21) Appl. No.: 15/671,837

(22) Filed: Aug. 8, 2017

(65) Prior Publication Data

US 2018/0044165 A1 Feb. 15, 2018

Related U.S. Application Data

(60) Provisional application No. 62/374,251, filed on Aug. 12, 2016.

(51) Int. Cl.
*B68C 1/20* (2006.01)
*B62J 9/00* (2006.01)

(52) U.S. Cl.
CPC .. *B68C 1/20* (2013.01); *B62J 9/00* (2013.01)

(58) Field of Classification Search
CPC ..... B68C 1/20; B68C 1/02; B68C 1/00; B62J 9/00; B62J 9/001; B62J 11/00; F16B 35/04; F16B 35/042; F16B 35/008; F16B 25/0015; F16B 25/106
See application file for complete search history.

(56) References Cited

U.S. PATENT DOCUMENTS

| | | | | |
|---|---|---|---|---|
| 3,288,112 A | | 11/1966 | Welton | |
| 3,440,922 A | * | 4/1969 | Cohen | B21K 1/46 411/397 |
| 3,468,211 A | * | 9/1969 | Suan | F16B 35/00 411/397 |
| 4,636,125 A | * | 1/1987 | Burgard | A01M 31/00 411/389 |
| 5,074,012 A | * | 12/1991 | Mitchell | B07B 1/46 24/514 |
| 5,375,956 A | * | 12/1994 | Pennig | A61B 17/8605 411/389 |
| 5,397,092 A | * | 3/1995 | Black | A47G 1/215 248/490 |
| 6,318,924 B1 | | 11/2001 | Schiavo, Jr. | |
| 6,612,631 B1 | * | 9/2003 | Pearl | B66C 1/66 248/499 |
| 6,775,965 B2 | | 8/2004 | Yarbrough | |
| 6,820,782 B1 | | 11/2004 | Monson | |
| 8,397,477 B2 | | 3/2013 | Stephens | |
| D687,289 S | | 8/2013 | Griffith | |
| 8,905,697 B2 | * | 12/2014 | Gong | E04D 3/3606 411/371.1 |

* cited by examiner

*Primary Examiner* — Daniel J Wiley
(74) *Attorney, Agent, or Firm* — Trenner Law Firm, LLC; Mark D. Trenner

(57) ABSTRACT

A saddle bag connector is disclosed. An example saddle bag connector includes a base portion, a post having an opening formed through the post, a pin configured to fit through the opening formed through the post, and a double threaded mounting portion configured for connection to the post. The mounting portion further configured to fasten the post to a saddle to receive a saddle bag on the post.

3 Claims, 8 Drawing Sheets

SADDLE BAG CONNECTOR

PRIORITY CLAIM

This application claims the priority benefit of U.S. Provisional Patent Application No. 62/374,251 filed Aug. 12, 2016 titled "Saddle Bag Connector" of Charles R. S. Wood, hereby incorporated by reference as though fully set forth herein.

BACKGROUND

Saddle bags have been provided for horses since about the time saddles were used. Saddle bags may be provided as part of the saddle, or hung over the saddle. Providing the saddle bags as part of the saddle is inconvenient, for example, when the rider does not need the saddle bags. Hanging the saddle bags over the saddle can result in the saddle bags shifting or falling off during riding.

DETAILED DESCRIPTION

The invention is a saddle bag connector is disclosed. The saddle bag connector may be provided for or implemented with a horse or equestrian saddle bag. It is noted, however, that the saddle bag connector could also be used with saddle bags for bicycles, motorcycles, etc. Indeed, the saddle bag connector is not limited to any particular end-use, and may find other applications, as will be readily understood by those having ordinary skill in the art after becoming familiar with the teachings herein.

Before continuing, it is noted that as used herein, the terms "includes" and "including" mean, but is not limited to, "includes" or "including" and "includes at least" or "including at least." The term "based on" means "based on" and "based at least in part on."

Figure 1:
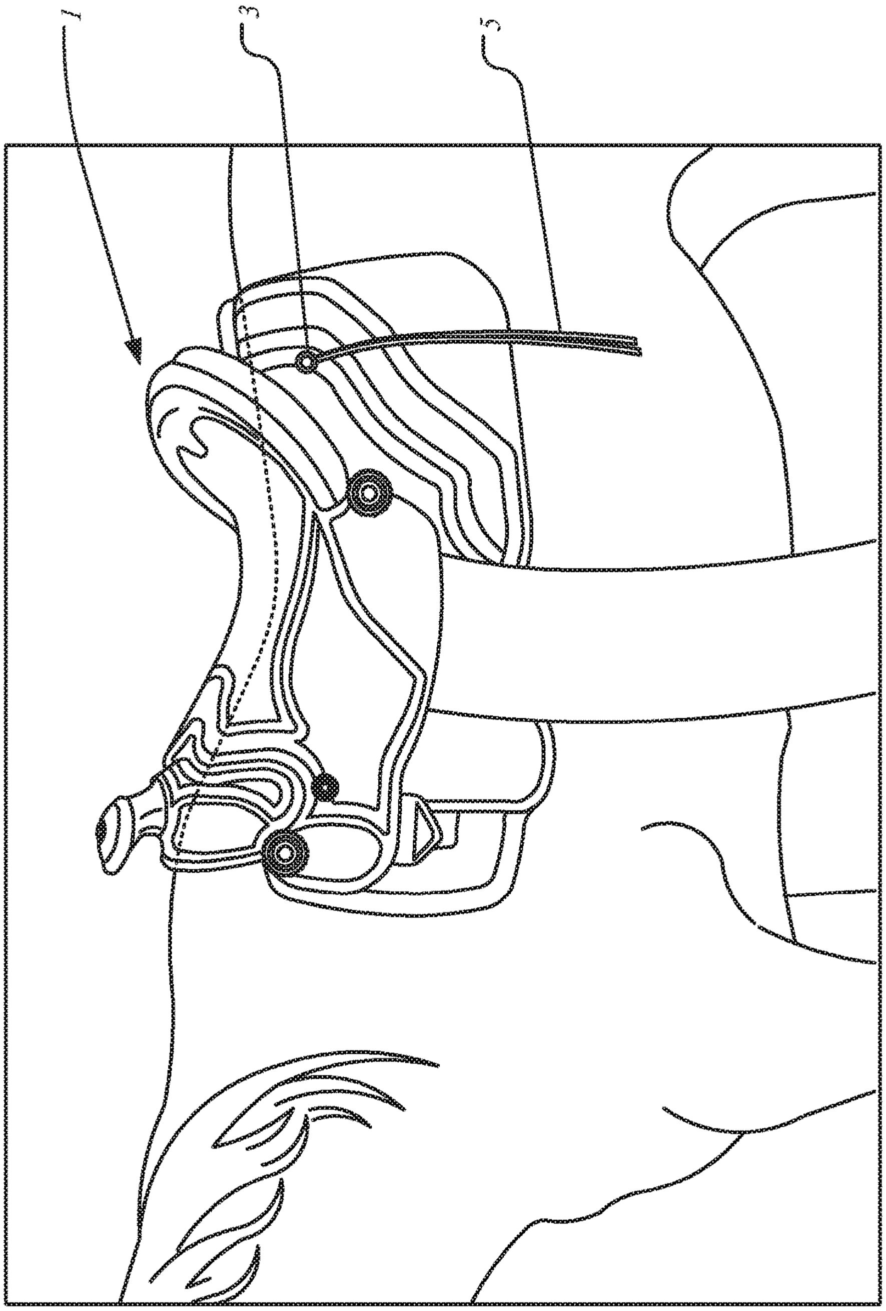
FIG. 1 is an illustration of a typical saddle of a horse which may be implemented with the example saddle bag connector disclosed herein.
Figure 2:
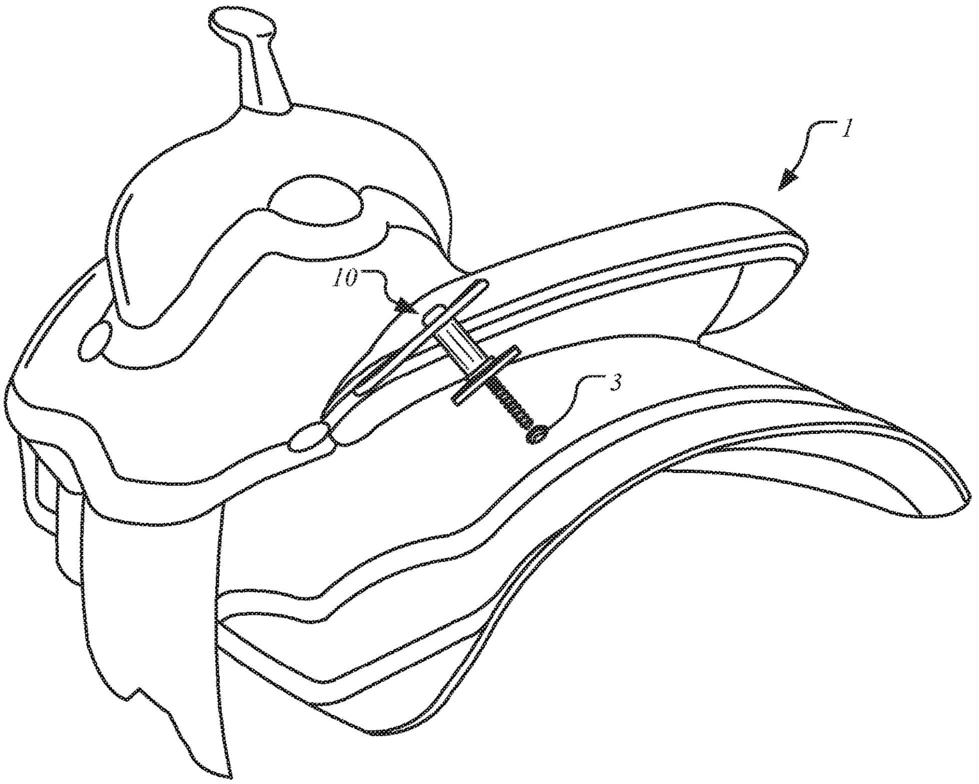
FIG. 2 is an illustration of an example saddle bag connector as it may be connected to a saddle.

FIG. 1 is an illustration of a typical saddle 1 of a horse which may be implemented with the example saddle bag connector 10 disclosed herein (see, e.g., FIG. 2). On a typical horse saddle 1, there is often provided a threaded female connection 3 formed in the horse saddle 1. Sometimes decoration or leather straps 5 are screwed into the threaded female connection 3. The leather straps 5 can be used to tie a saddle bag onto the horse saddle 1.

FIG. 2 is an illustration of an example saddle bag connector 10 as it may be connected to a saddle (e.g., the horse saddle 1 shown in FIG. 1). As described above, the saddle 1 may include leather straps 5, or other decoration (or even just an opening). In any event, the leather straps 5 or other decoration may be unscrewed from the horse saddle 1, thus leaving an open threaded female connection 3 formed in the saddle 1, as can be seen in FIG. 2. This connection 3 in the saddle 1 is already configured to receive a male threading (e.g., of the leather straps 5). As such, the saddle bag connector 10 can be configured (e.g., with male threading) to connect to the saddle 1. In an example, the saddle bag connector 10 replaces the leather strap 5 (or other decoration) and can be implemented to attach a saddle bag 6 (or other item) to the saddle 1, as illustrated in FIGS. 3A-B.

Figure 3A:
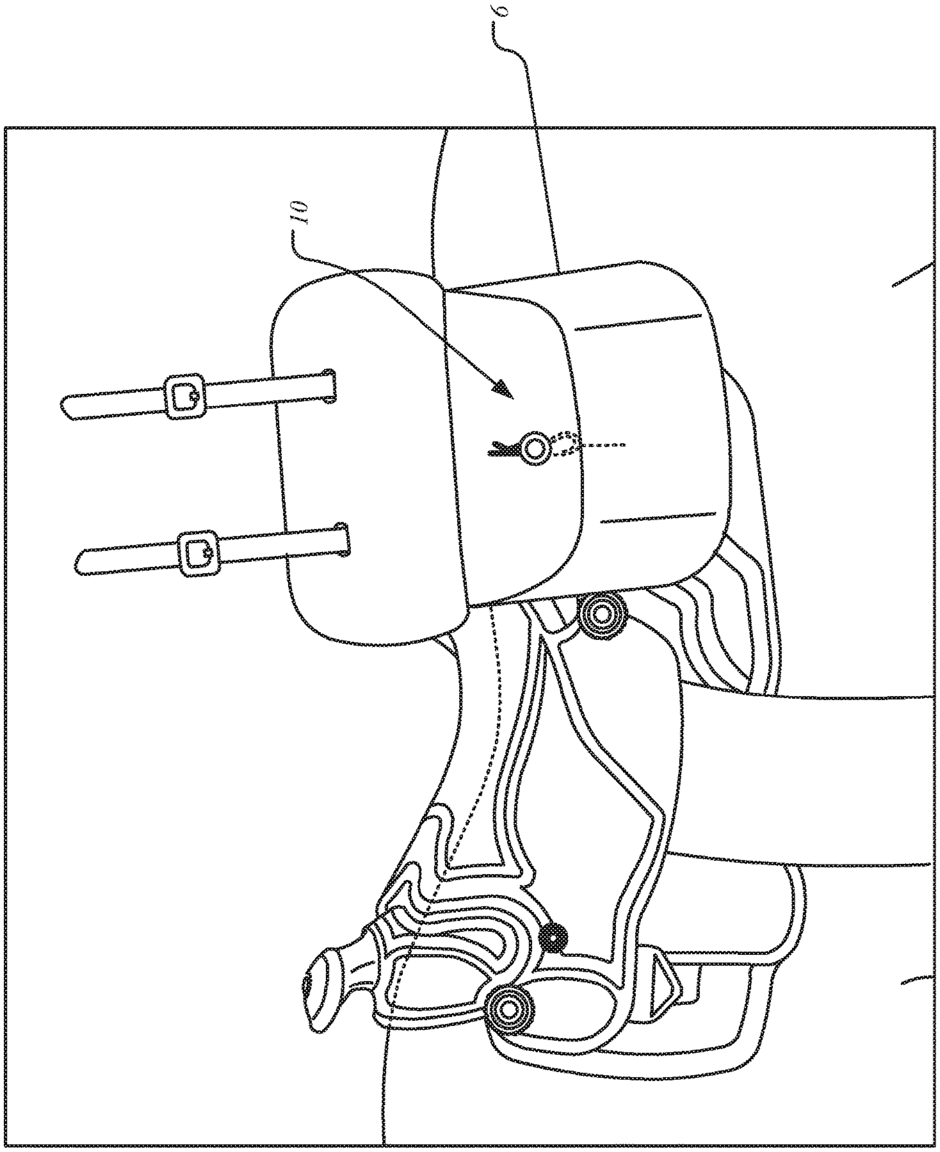
FIGS. 3A-B are illustrations of an example saddle bag connector implemented to connect a saddle bag to a saddle.
Figure 3B:
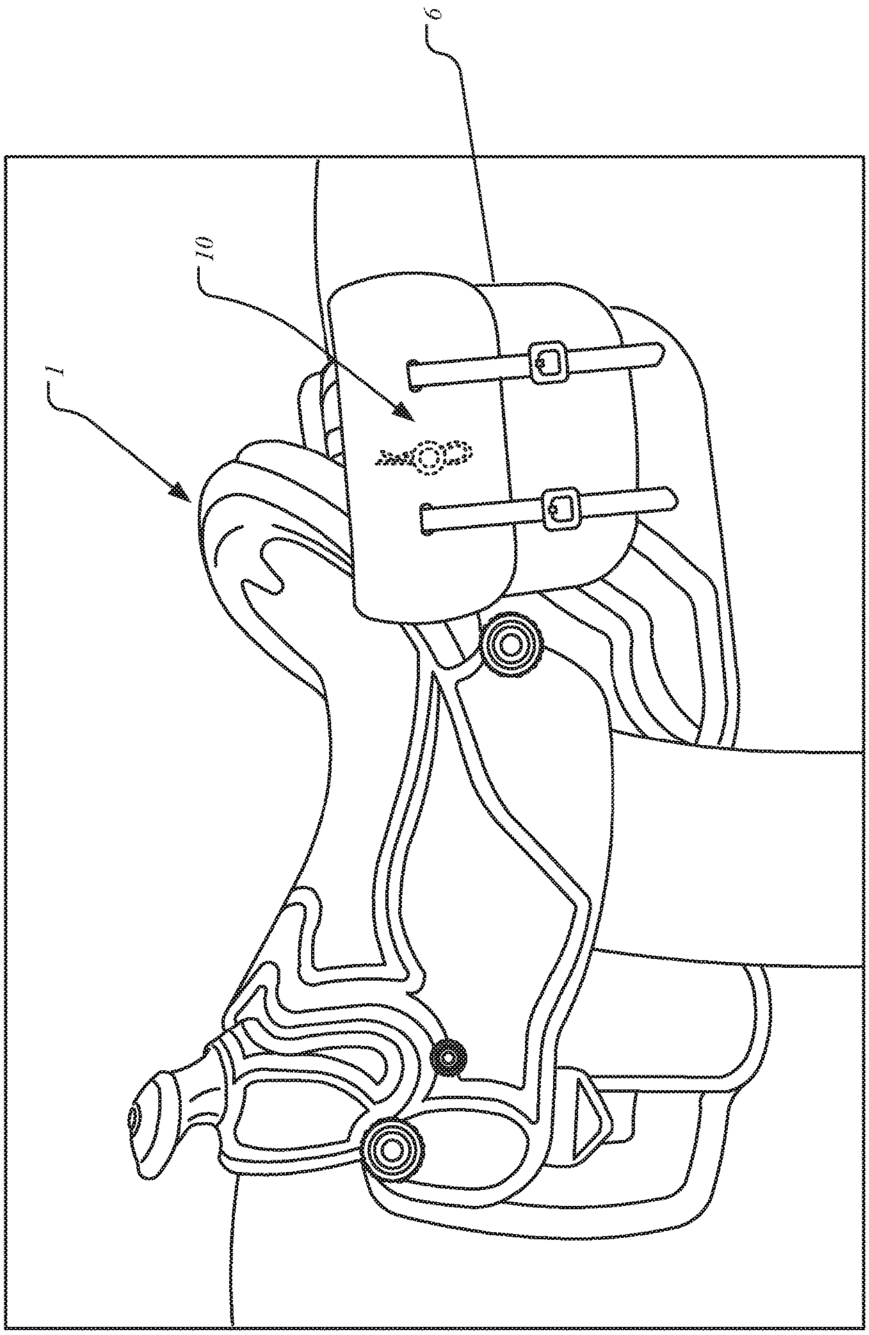

FIGS. 3A-B are illustrations of an example saddle bag connector 10 implemented to connect a saddle bag 6 to a saddle 1. In an example, the saddle bag connector 10 is threaded into the opening 3 of the saddle. This provides a post 11 (e.g., shown in FIG. 4) that is mounted onto and extends outward from the saddle 1. A saddle bag 6 can be hung on the post 11. For example, an opening formed in the back of the saddle bag 6 may be fitted over the post 11 and slid onto a neck portion 13 of the post 11, and slid up against base portion 14 (e.g., shown in FIG. 4). A pin 18 (e.g., shown in FIG. 4) can be slid through an opening 16 (e.g., shown in FIG. 4) that is formed in the post 11. The pin 18 maintains the saddle bag 6 on the neck portion 13 of the post 11 so that the bag does not fall off of the post 11. As such, the saddle bag 6 can be mounted to the saddle 1.

Before continuing, it should be noted that the examples described herein are provided for purposes of illustration, and are not intended to be limiting. Other devices and/or device configurations may be utilized to carry out the operations described herein.

Figure 4:
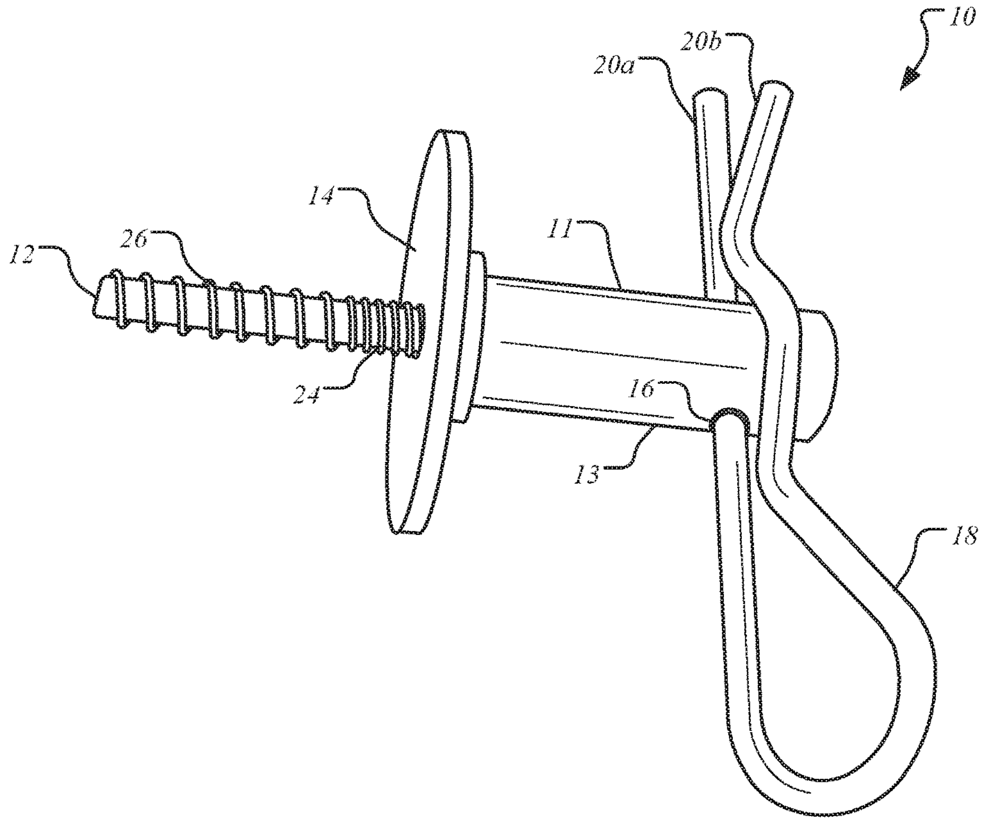
FIG. 4 is a perspective view of an example saddle bag connector.

FIG. 4 is a perspective view of an example saddle bag connector 10. In an example, the saddle bag connector 10 includes a post 11 configured to receive a saddle bag (e.g., saddle bag 6 shown in FIGS. 3A-B). A mounting portion 12 may be connected to a base portion 14 of the post 11. It is noted that the base portion 14 and the post 11 may be separate components connectable to one another. Or in another example, the post 11 and base portion 14 may be formed as a unit.

An opening 16 may be formed through the post 11. A pin 18 may be configured to fit (e.g., one of the two legs 20*a-b*) through the opening 16 in the post 11. In an example, the pin 18 may be a cotter pin. Other examples of fasteners are also contemplated which can be implemented instead of a cotter pin, as will be readily appreciated by those having ordinary skill in the art after becoming familiar with the teachings herein.

The mounting portion 12 is configured to fasten the post 11 to a saddle (e.g., the saddle 1 shown in FIG. 1, or seat of a bicycle or motorcycle, etc.). The saddle bag (e.g., saddle bag 6 shown in FIGS. 3A-B) can then be hung on the post 11. After the saddle bag is hung on the post 11, pin 18 may be slid through opening 16 in the post 11 to maintain the saddle bag on the post 11.

Figure 5:
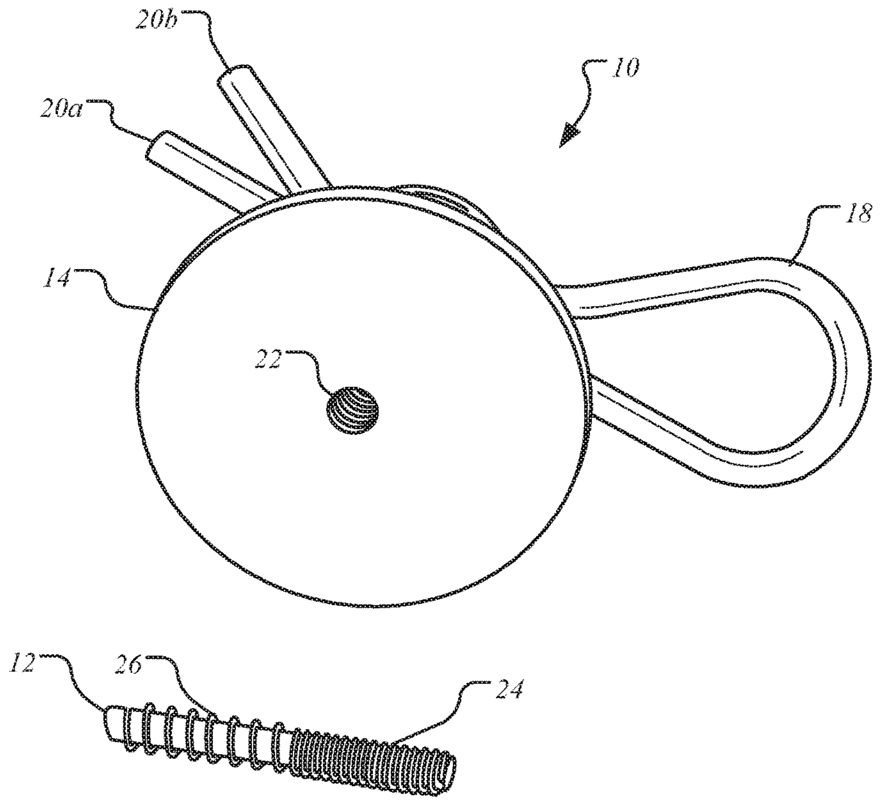
FIG. 5 is a rear perspective view of an example saddle bag connector with a mounting portion as it may be removed from the saddle bag connector.
Figure 6:
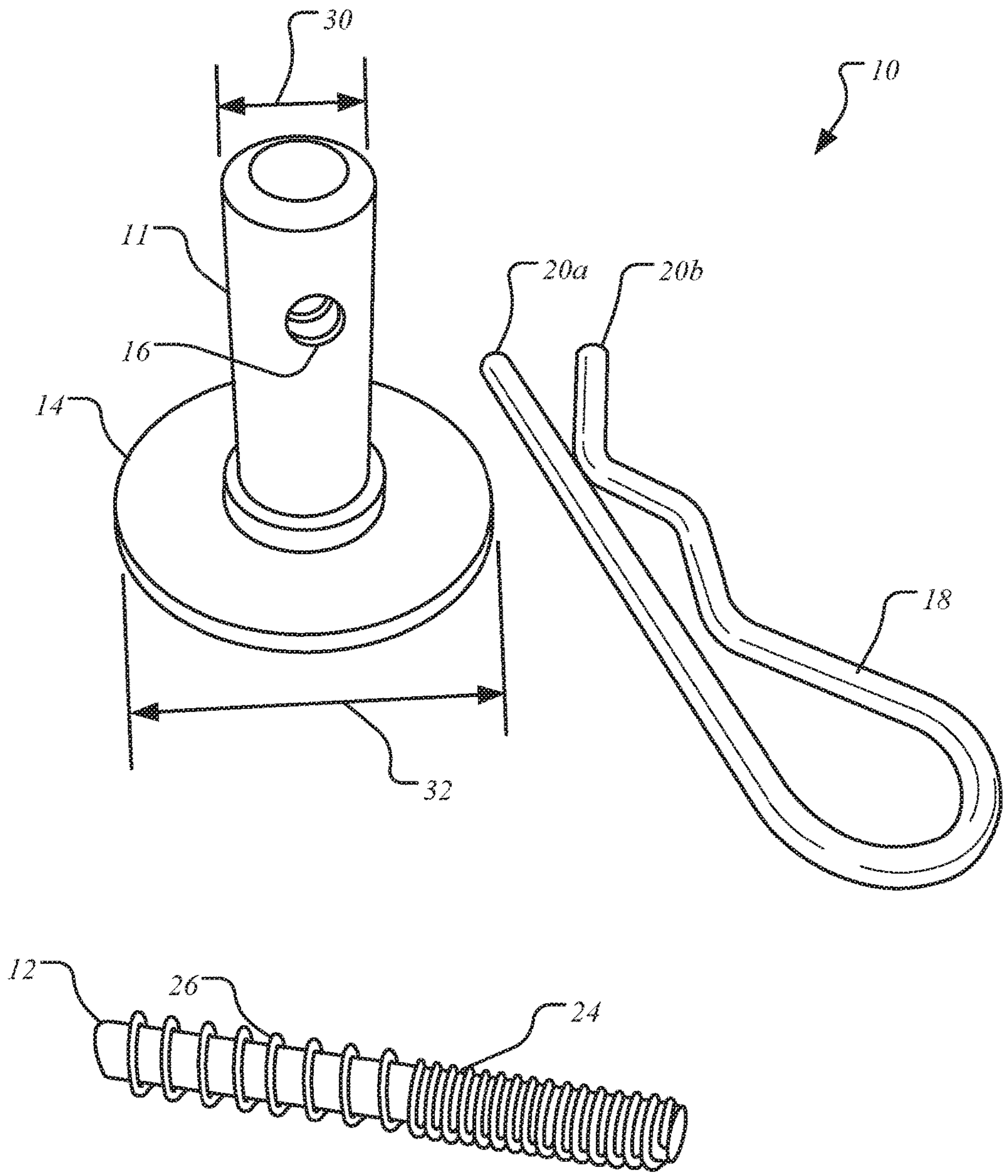
FIG. 6 is a top perspective view of components of an example saddle bag connector.
Figure 7:
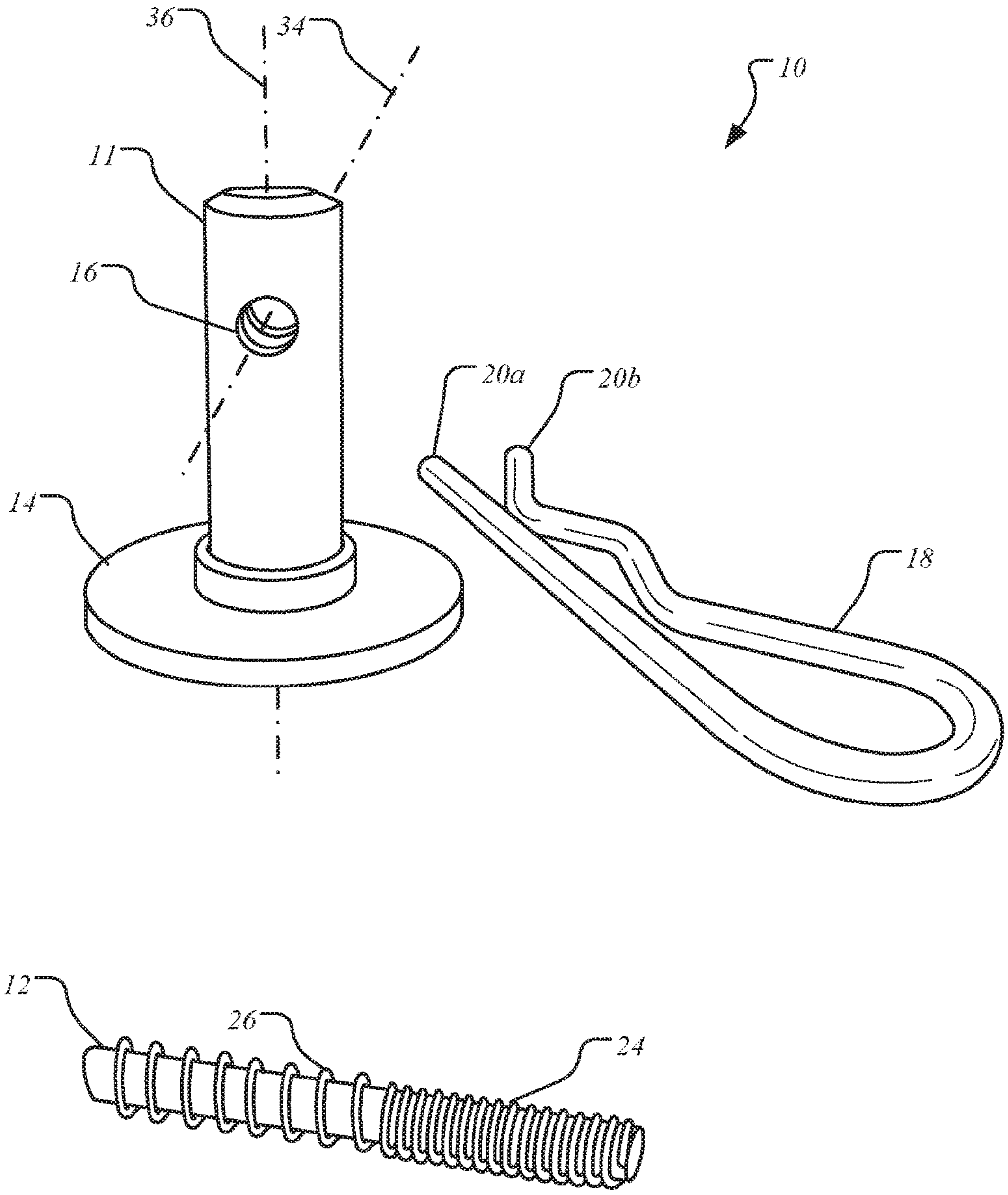
FIG. 7 is a side perspective view of components of an example saddle bag connector.

FIG. 5 is a rear perspective view of an example saddle bag connector 10 with a mounting portion 12 as it may be removed from the saddle bag connector 10. FIG. 6 is a top perspective view of components of an example saddle bag connector 10. FIG. 7 is a side perspective view of components of an example saddle bag connector 10.

The example saddle bag connector 10 is also shown including a base portion 14. In this example, the base portion 14 is substantially disc-shaped. However, the base portion 14 may also be other shapes.

The example saddle bag connector 10 is shown in FIGS. 5-7 including a post 11 configured to receive an item (e.g., a saddle bag, decoration, etc.).

The example saddle bag connector 10 is shown in FIGS. 5-7 including a post 11. In an example, the post 11 is substantially cylindrical-shaped. The post 11 may have a diameter 30 that is about one-half the size of a diameter 32 of the base portion 14. As such, the base portion 14 provides a surface for the saddle bag (or other item) to butt against when hung on the post 11.

In an example, an opening 16 is formed through the post 11. The opening 16 may have a central axis 34 that is substantially perpendicular to a central axis 36 of the post 11. Other configurations of the opening 16 are also contemplated.

In an example, a pin 18 is configured to fit through the opening 16 formed through the post 11. For example, after the saddle bag is hung on the post 11, the pin 18 may be inserted through the opening 16 to secure the saddle bag to the post 11.

The example saddle bag connector 10 is also shown including a mounting portion 12. The mounting portion 12 is configured for connection to the post 11. In addition, the mounting portion 12 is further configured to fasten the post 11 to a saddle or other object (e.g., motorcycle seat, post, etc.).

In an example, the mounting portion 12 is double threaded. One of the double threads 24 on mounting portion 12 is configured (e.g., a machine thread) to mate with a threaded opening 22 formed in the base portion 14 and/or the post 11. Another one of the double threads 26 on mounting portion 12 is configured to mate with a threaded opening formed in the saddle (e.g., threaded female connection 3 formed in the saddle 1 as can be seen in FIG. 2).

In an example, the threads 26 may be self-tapping and/or self-threading. As such, the saddle bag connector 10 can be mounted to a saddle or other object that does not have a preconfigured opening.

It is noted that the components and connections described above with reference to FIGS. 4-7 are illustrative of an example saddle bag connector 10. Still other examples for connecting the saddle bag or other item to the saddle bag connector 10 are contemplated, as will be readily appreciated by those having ordinary skill in the art after becoming familiar with the teachings herein.

It is noted that the examples shown and described are provided for purposes of illustration and are not intended to be limiting. Still other examples are also contemplated.

The invention claimed is:

1. A saddle bag connector, comprising:

a substantially cylindrical post configured to receive a saddle bag, the post comprising:
  - opposing first and second ends,
  - a disc-shaped base portion formed at the first end, with a threaded opening extending longitudinally from the base portion into the post, and
  - a transverse opening at the second end, the opening receiving a pin; and a mounting portion comprising a first threaded end and a second threaded end opposite the first threaded end, the first threaded end engaged in the threaded opening in the post, such that the second threaded end extends longitudinally outward from the base portion and is configured to fasten the post to a saddle.

2. The saddle bag connector of claim 1, wherein the post has a diameter that is about one-half the size of a diameter of the base portion.

3. The saddle bag connector of claim 1, wherein the second threaded end of the mounting portion is configured to mate with a threaded opening formed in the saddle.

* * * * *